(12) United States Patent
Erben et al.

(10) Patent No.: US 6,457,674 B2
(45) Date of Patent: Oct. 1, 2002

(54) METHOD AND DEVICE FOR CLOSING A DOOR OF AN AIRCRAFT

(75) Inventors: Hannes Erben, Donauwoerth; Alfred Hohl, Oberndorf; Thomas Tendyra, Schwenningen, all of (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/845,530

(22) Filed: Apr. 30, 2001

(30) Foreign Application Priority Data

Apr. 28, 2000 (DE) .......................................... 100 20 825

(51) Int. Cl.$^7$ ................................................. B64C 1/14
(52) U.S. Cl. .................................. 244/129.5; 244/129.4
(58) Field of Search ............................ 244/129.5, 129.4

(56) References Cited

U.S. PATENT DOCUMENTS

| | | | |
|---|---|---|---|
| 4,180,943 A | | 1/1980 | Smith et al. |
| 4,560,123 A | * | 12/1985 | Sealey et al. ............ 244/129.5 |
| 5,305,969 A | | 4/1994 | Odell et al. |
| 5,337,977 A | * | 8/1994 | Fleming et al. .......... 244/129.5 |
| 5,823,473 A | * | 10/1998 | Odell et al. .............. 244/129.5 |
| 6,168,113 B1 | * | 1/2001 | Hann et al. .............. 244/129.5 |

FOREIGN PATENT DOCUMENTS

| | | |
|---|---|---|
| DE | 19702084 | 2/1998 |
| GB | 2189539 | 10/1987 |
| GB | 2332705 | 6/1999 |

\* cited by examiner

*Primary Examiner*—J. Woodrow Eldred
(74) *Attorney, Agent, or Firm*—W. F. Fasse; W. G. Fasse

(57) ABSTRACT

A door, especially an aircraft door, is first closed, for example manually. Then the door is first latched by a latching mechanism and locked by a locking mechanism. The latching mechanism and the locking mechanism are operatively connected through respective force transmitting couplings to a common drive in such a way that the latching mechanism is first moved to establish a latching position. Then, with a delay, the locking mechanism is moved into a locking position by the same drive to establish a latched and locked position.

9 Claims, 4 Drawing Sheets

METHOD AND DEVICE FOR CLOSING A DOOR OF AN AIRCRAFT

This application is based on and claims the priority under 35 U.S.C. §119 of German Patent Application 100 20 825.8, filed on Apr. 28, 2000, the entire disclosure of which is incorporated herein by reference.

FIELD OF THE INVENTION

The invention relates to a method and a device for closing a door, particularly of an aircraft. When a door is closed in a closed position, it is then also brought into a latched position, whereby the door is latched in the frame of the fuselage structure by a latch mechanism.

BACKGROUND INFORMATION

Conventional aircraft doors have at least one latch mechanism with a drive shaft drivable by a latch drive. The drive shaft is connected to a latch element arranged on a latch axis or shaft and to the latch drive. The latch element is adapted for engaging a latch stop arranged in the frame of the aircraft structure. German Patent Publication DE 197 02 084 C1 discloses such a door for an aircraft. The door is moved from an open position to a closed position and then to a latched position, with the door being latched in the frame of the fuselage structure by a latch mechanism.

It is further known to guide a door, during closing at the end of the swinging-in movement, along a stroke motion path which essentially conforms to the exterior contour of the aircraft. The stroke motion path is essentially aligned transversely to the swinging direction of the passenger door. At the end of the swinging path and at the start of the stroke motion path, the passenger door is lowered and guided into a closed position by a manual operation of a hand lever. The closed position involves a positive engagement of the stop elements which are fixed to the door, with the accommodating elements which are fixed to the door frame. At this stage the hand lever has not yet completed its entire travel path. There is still a small distance to be traversed by the hand lever. A further manual operation of the hand lever along the travel path until the limit position of the hand lever has been reached, latches the passenger door in the closed position by means of a door latch mechanism. The latch mechanism brings the door into a latched position and holds it there. The latch mechanism for a passenger door functions independently of a support device and of a tilt-position control of the passenger door. In the structurally simplest case the passenger door is latched by a bolt or a hook movable into a latching position, whereby the bolt engages an anchorage in the door frame of the aircraft structure, or the hook reaches behind a stop. The latch mechanism with the bolt or hook is for example activated by a rotatable drive shaft which is connected to the manually operable hand lever.

Aircraft which are in service today are equipped with doors which are manually swingable, by activating a hand lever, into the closed position and onward into the latched position. The force of the hand lever is transmitted to the latching axis or shaft with the bolt or hook through a drive shaft and a rod assembly.

Dynamic loads on the door during the f light can result in vibrations which may cause a reversal of the latch action. This can lead to the danger of the passenger door opening during flight. Such a danger might also exist if the latch drive breaks.

OBJECTS OF THE INVENTION

In view of the above it is an object of the invention to achieve the following objects singly or in combination:

- to avoid door failures particularly during flight, and especially of the latch mechanism of an aircraft door;
- to provide an economical door latching and locking mechanism useful for any door but particularly suitable for various types of aircraft doors;
- to latch and safety lock a door, such as an aircraft door, with a single drive that is operable either by a hand lever or a motor, preferably moving in the same direction for all functions; and
- to avoid using separate drives for the latching and safety locking functions.

SUMMARY OF THE INVENTION

The method according to the invention achieves the foregoing objects in that a latch mechanism which holds the door in a latched position is locked by means of a safety lock mechanism which due to a delayed movement of a respective force transmission coupling is activated by a single drive, whereby the latching and safety locking steps are performed in sequence by the same drive.

The above objects have been further achieved by an apparatus according to the invention in that a single drive shaft for a latching mechanism is also connected to a safety lock mechanism by a respective force transmission coupling. The safety lock mechanism is hingeably or slideably held on a lock axis.

Further, the safety lock mechanism is arranged so as to engage a lock element attached to a latch axis.

In the case of an existing latch mechanism, the latch drive is guided according to the invention along a remaining travel distance by means of a single drive for the latching and the locking, with a delayed movement of the safety locking mechanism into a safety locking position with a slightly spaced apart engagement with a lock element on the latch axis. The delayed movement is transferred to the lock element or elements from the single drive through a second force transmission coupling, with the latch drive or first force transmission coupling remaining in the latching position. The single drive and first and second couplings or force transmissions comprise for example a gear arrangement. Preferred, however are coupling rods and journal links. Gear wheels, cam disks or a cam controls are also suitable for realizing the first and second couplings. However, the use of rods and journal links with angular positions and dead points is particularly cost-effective. According to a special embodiment, these rods and links with angular positions and dead centers or points constitute the force transmission couplings between the single drive and the latching and safety locking mechanisms. An intermediate shaft can be arranged between the drive shaft and the lock drive or between the drive shaft and the latch drive. In this way, the movement mechanism can be optimized.

According to a further embodiment, the latch axis or shaft can be connected to a transmission mechanism which synchronizes latching and locking of a vent flap in the door, relative to the latch and lock mechanism of the door. Similarly, an indicator for showing the door status "closed", "latched" and "safety locked" may be coupled to the single drive. According to a further embodiment, the drive shaft can be connected to a transmission mechanism which guides the door from an open position to a closed position and vice versa.

The invention is suitable for use in doors other than aircraft passenger doors. Any closure that needs to be latched and locked can be equipped with the present apparatus. The term door is intended to include, e.g., any freight door, any cargo hatch closure, any closable engine fairing or any other closures that are not subject to pressure, in the secondary structure of an aircraft such as cabin doors and closures of passageways between decks. The term door further includes any closure cover which in its open position is not connected to the frame of a fuselage structure.

The invention provides the advantage that with only one drive, which already exists for the purpose of latching, the additional function of "safety locking" is achieved, whereby savings are achieved by avoiding additional production costs and additional door weight. There is no increase in inspection expenditure.

Although the latching and following safety locking involves an additional operator function at the door, the operator comfort achieved by a single drive is maintained, particularly since any direction reversal of the drive between latching and safety locking is avoided according to the invention.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

The passenger door 20, 200 as such is a construction which is known from DE 197 02 084 C1 mentioned above. The passenger door is hingeable by a support arm on one side of the door frame DF of the aircraft fuselage F, so as to be liftable, swingable, and lowerable.

Figure 1:
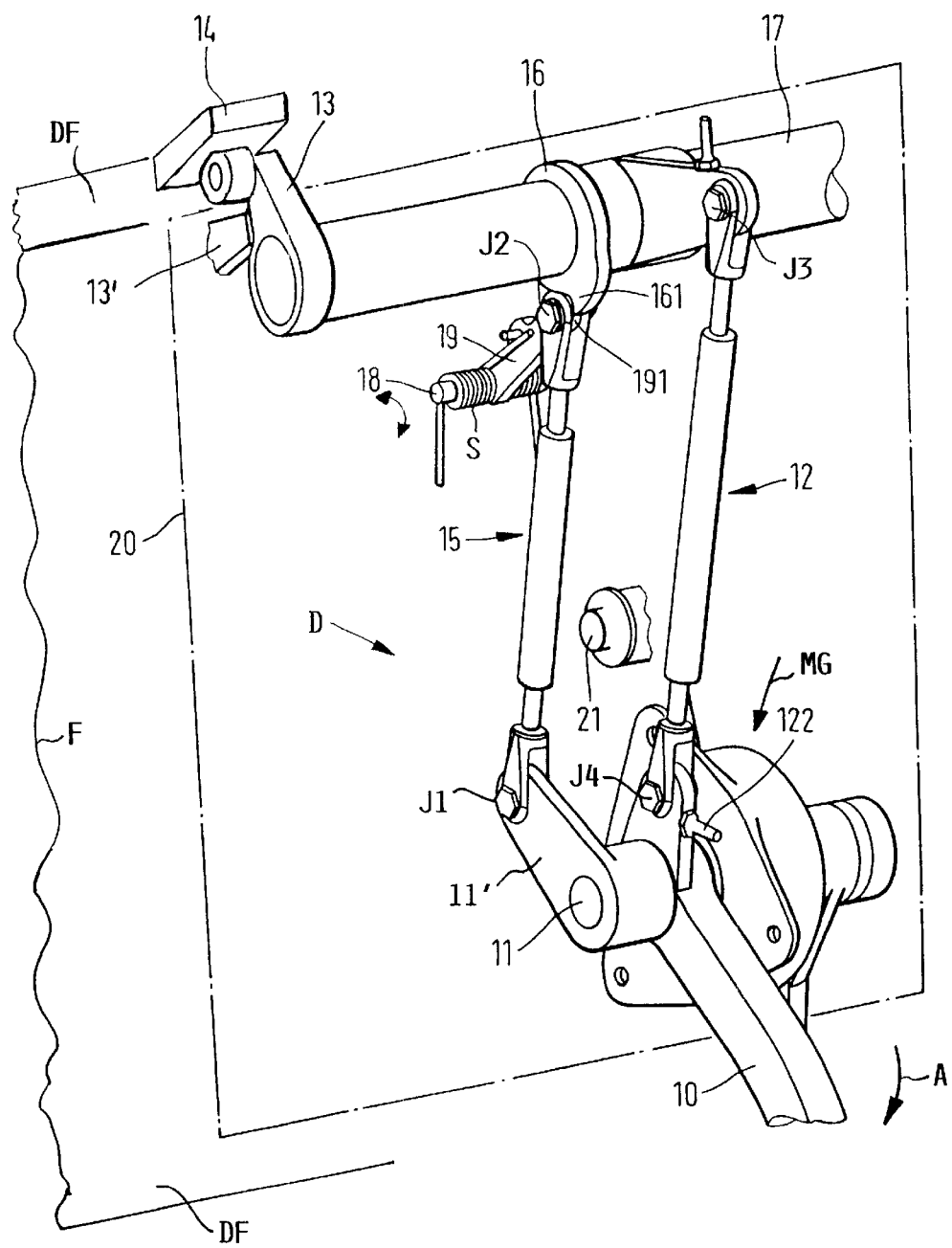
FIG. 1 is a diagram of a first embodiment according to the invention in a latched position and in a locked latched position also referred to as "safety locked" position.

The following description refers to FIG. 1 and explains the latching and locking functions achieved according to the invention by a movement mechanism or drive D. FIG. 1 shows the device according to the invention in a "latched and safety locked position".

During a closing operation of a passenger door or a freight door, for the sake of brevity, herein referred to as "door", an operator swings the door from an open position along a swinging in path. At the end of the swinging-in path, the door is positioned in front of a door opening formed by a door frame DF in the fuselage F. The operator in the interior of the passenger cabin operates the drive lever 10 of the drive D in the direction of the arrow A clockwise. The drive lever 10 can be a hand lever and/or an electric motor and gear MG with a motor control system. The electric motor and gear MG can for example be an individual drive for a latch mechanism or it can be a central drive which is activated by a switching gear assembly as required.

The drive lever 10 is connected to a drive shaft 11 which is rotatably mounted in the door structure. The lever 10 is guidable along a section of an arc-shaped track for approximately 110°. The lever 10 can be independently operated either by an operator positioned inside or outside the aircraft cabin. When the drive lever 10 is operated, the door is lowered along a stroke motion path into a closed position. The closed position involves a positive engagement of stop elements which are fixed to the door side, with respective catch elements which are fixed to the door frame DF secured to the aircraft fuselage.

Immediately after the door has assumed the closed position, a movement of a latch element 13, arranged on a latch axis or shaft 17, takes place into cooperation with a retention member or stop 14 by way of further movement of the drive shaft 11 and a first force transmission coupling 12 also referred to as a latch drive 12 coupled to the drive shaft 11 by a journal link J4. When latch element 13 and the stop member 14 are engaged the latching is complete. The latch element 13 can for example be a hook or a roller; correspondingly, the retention member 14 can be an eyelet, a roller, or an opposite fitting capable of cooperating with the element 13. The stop member 14 is arranged in the door frame of the aircraft fuselage F. The movement path of the latch element 13 is limited by at least one further stop 13'. The latch drive 12 for example comprises a rod assembly with angular positions and dead centers or dead points for transmitting power from the drive 10 through the shaft 11 to the latch axis 17 which is mounted for rotation in the door structure. However, other types of drives may be used, e.g. an eccentric cam disk or the like.

The latch element 13 and a first safety lock element 16 are both rigidly mounted on the latch axis or latch shaft 17. Therefore, the lock element 16 also moves to a limit position, whereby the door is latched in the "latched position", i.e. the latch element 13 engages the retention member 14 while the first lock element 16 is in its limit position.

In this latched position with the first lock element 16 in its limit position, the arrangement or position of the components 16, 19 and 13, 14 relative to each other is such, according to the invention, that a small additional movement of the drive 10 is possible. More specifically, when the latched position is reached, the drive 10 still has a small remaining angular distance to. travel (approximately 40°) to the limit position of its arc-shaped track as defined by stop members 121 and 122. This is possible by the angular arrangement of the drives 12 and 15 relative to each other on the shaft 11. It has been found that this small additional movement of the drive 10 by about 40° beyond a dead point can be advantageously used to operate the safety locking and latching mechanism of the invention. Thus after the latched position has been attained, a delayed movement of a second safety locking member 19 becomes possible. This delayed "lock movement" is possible as a result of the present construction of the movement mechanism or drive D, which is located within the door, and comprises the drive shaft 11, the latch drive 12 or first force transmission coupling, the lock drive 15 or second force transmission coupling, the latch axis 17 or shaft and the lock axis 18 or shaft. The movement mechanism or drive D of the invention is preferably, but not necessarily, constructed of coupling rod assemblies and journal links J1, J2, J3 and J4 capable of assuming angular positions and dead points. This force transmission system allows a delayed movement, so to speak, of the second lock element 19 after the latching position has been reached. The angular movement of the coupling rod assemblies is possible due to the journal links. However, as mentioned, the stop members 121 and 122 limit any movement beyond the dead points to about 40 sufficient for the above mentioned delayed movement.

The rod assemblies of the movement mechanism D forming the first force transmission coupling 12 and the second force transmission coupling 15 could also be combined with cam disks, gear wheels or with a cam control or a so-called Maltese cross. The use of other forms of force transmission couplings is also possible. is According to another embodiment, the movement mechanism or drive D could also be constructed so that an intermediate shaft is arranged between the lock drive or coupling 15 and the drive shaft 11 or between the latch drive or coupling 12 and the drive shaft 11. However, basically this does not alter the described function of the present apparatus. In addition, force-exerting elements, such as springs S, can lock or bias the movement mechanism or drive D in its limit position or positions.

When the drive lever 10 traverses the remaining travel distance (approximately 4°), the lock drive or coupling 15 is activated since the coupling 15 is journalled by the link J1 and a lever arm 11' to the drive shaft 11. The slight rotation of the drive shaft 11 transmits the force to the lock drive or coupling 15, whereby the latch drive or coupling 12 moves through and beyond a dead point, that is, past a neutral position thereby abutting the latch element 13 against an end stop 14 so that forces other than those provided by the drive 10, 11 cannot apply an opening moment to the rod assembly. Further, the latch drive or coupling 12 cannot leave the latching position, for example as a result of vibrations, because the latching position is, as mentioned, a position beyond the dead point of the coupling 12.

The upper end of the lock drive or coupling 15 is journaled by a journal link J2 to a second locking member 19. One end of the second locking member 19 is connected to a lock axis 18 which either forms a journal for the member 19 or is itself journaled in the door structure, so that the second locking member 19 may be rotated counterclockwise into a locking position or clockwise into a disengaged position. Preferably, a spring S biases the second locking member 19 into the locking position. The lock drive 15 drives the second locking member 19 with its head 191 directly in front of a stop 161 of the first locking member 16. In this position the first locking member 16 and the second locking member 19 are effectively engaged with each other at 161, 191 yet slightly spaced apart. If, for any reason, the latch axis 17 is moved in the direction of a door opening, and if, at the same time there is a failure within the latch drive 12, the first lock member 16 and the second locking member 19 remain positively engaged to maintain the safety locking function.

The lock member 16 is firmly connected to the latch axis 17 and thus locks any reverse rotation of the latch axis if the latch drive 12 should fail, whereby unlatching is positively prevented, since the latch axis 17 is locked at 161, 191 against unwanted reverse rotation out of the latched position. The door has reached a so-called "latched and locked position".

When the latch element 13 is functioning properly, the lock mechanism with the first locking member 16 and the second locking member 19 are not subjected to any loads, yet these members 16, 19 are functionally in a locking position or in a locking "ready" position. If the latch axis 17 is subjected to loads and if at the same time there is a fault in the latch drive 12, the second locking member 19 is pushed against the first locking member 16, thus locking the latch axis 17 against reverse or clockwise rotation out of the latched position. It is also advantageous if the free play for the latch element 13 is relatively large prior to initiating any movement which lifts the door.

If cam disks are used in the movement mechanism or drive D, then these disks should be constructed so that in the latched and locked position, no forces must act on the second locking member 19 as a result of the latching operation.

Figure 2A:
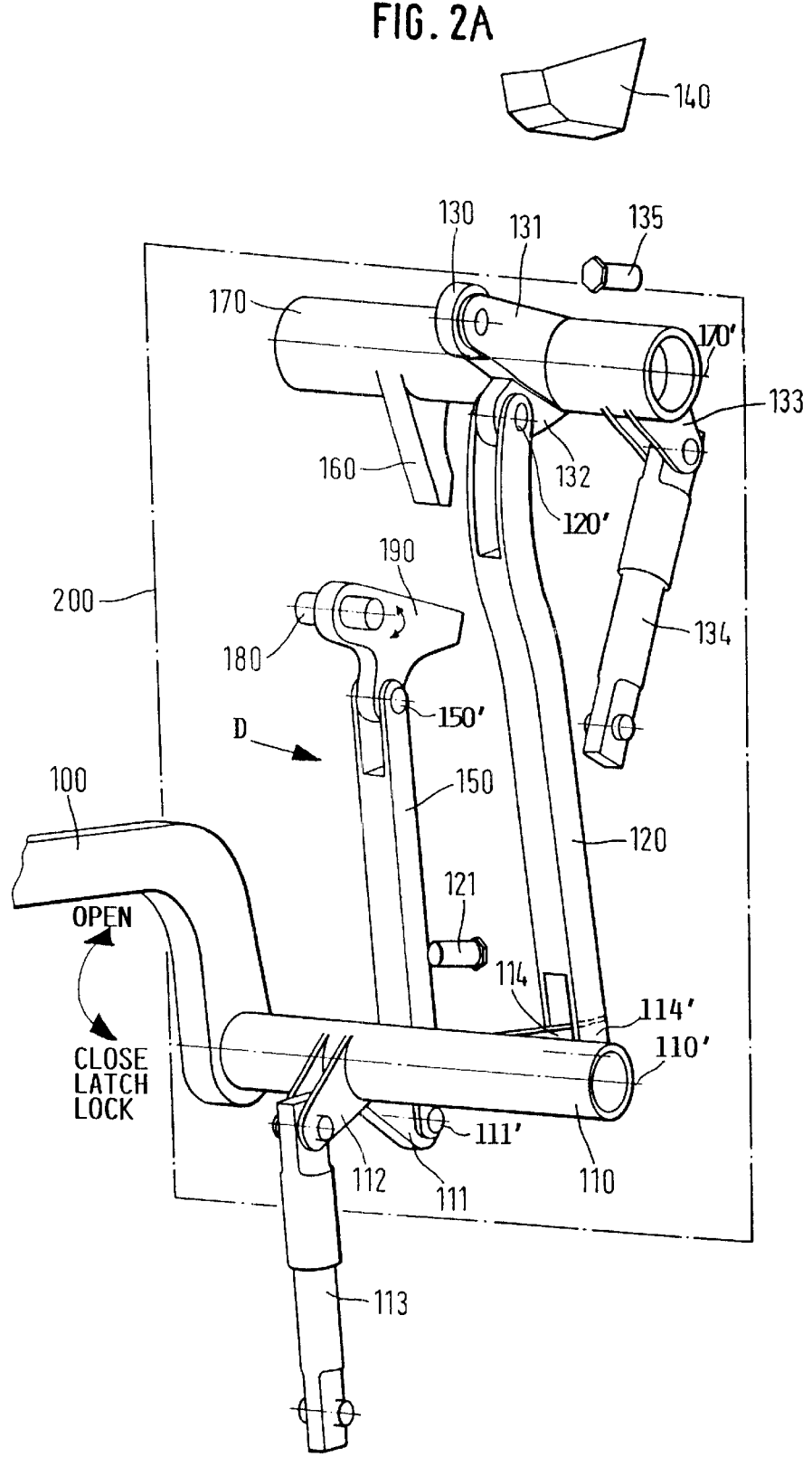
FIG. 2A shows a second embodiment of the present apparatus in its unlatched and unlocked position.
Figure 2B:
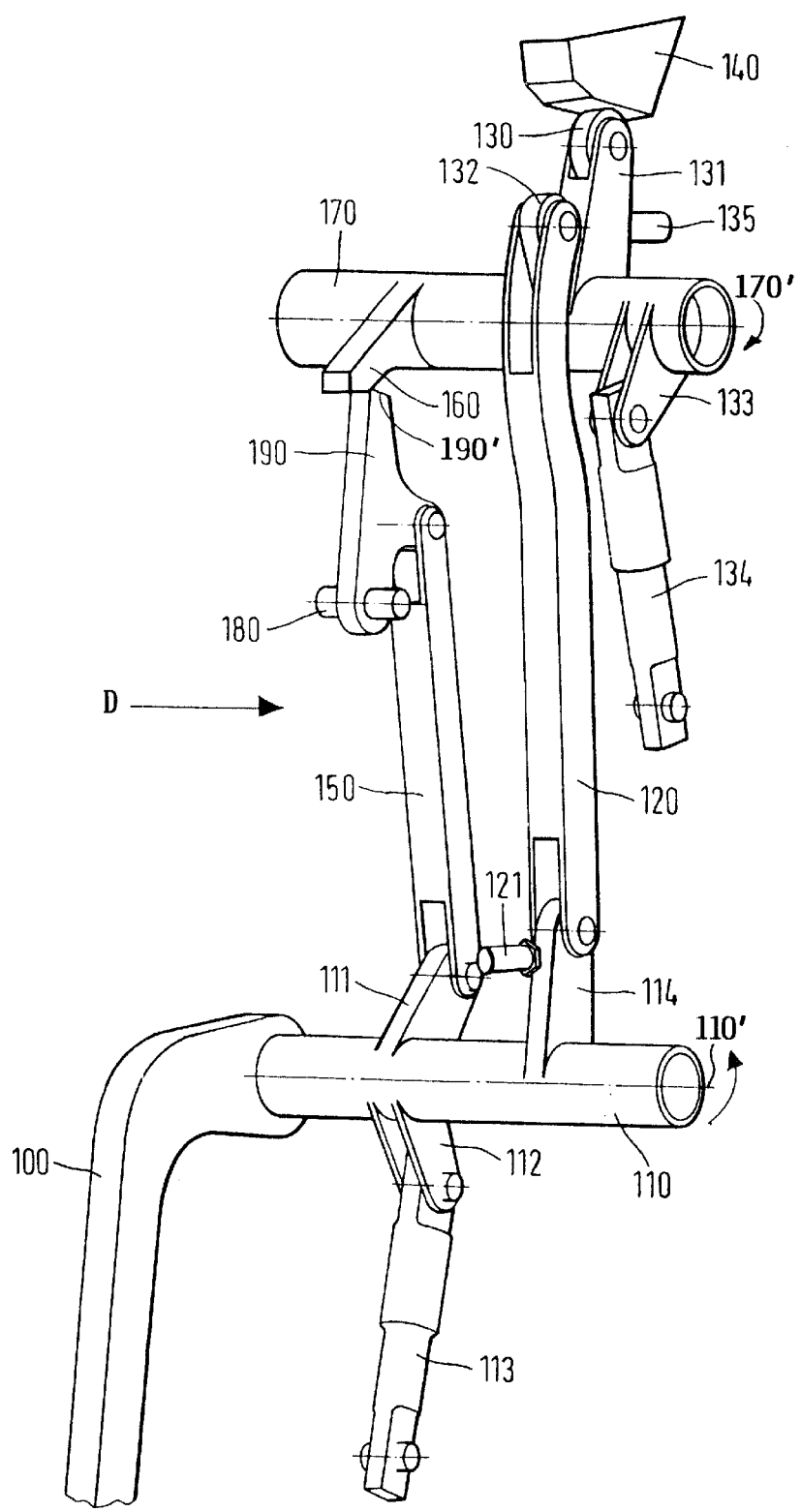
FIG. 2B shows the apparatus of FIG. 2A in the latched position but still in the unlocked position.
Figure 2C:
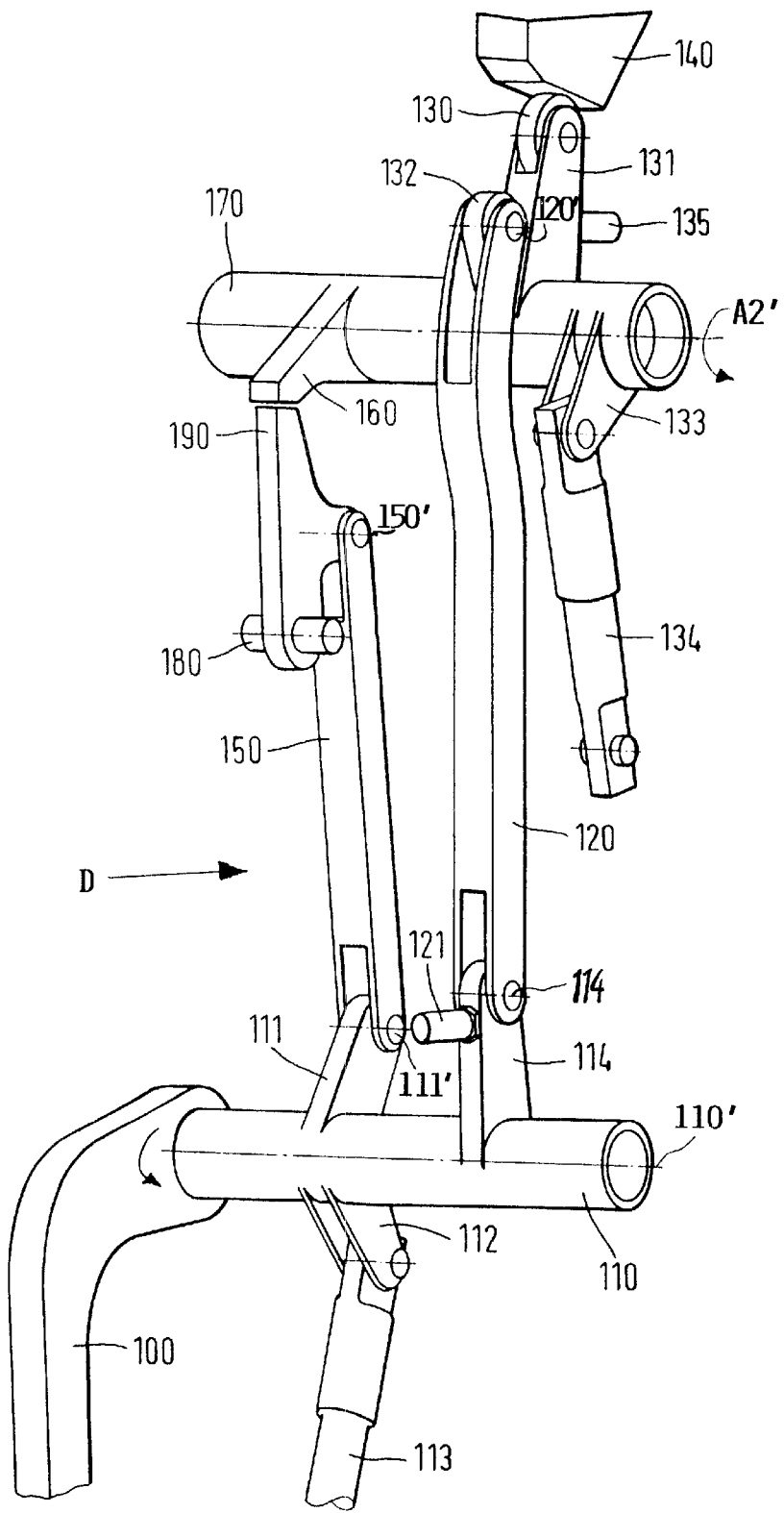
FIG. 2C shows the apparatus of FIG. 2A in the latched position and in the safety locked position.

FIGS. 2A, 2B, 2C show sequentially the movements of the latching and locking mechanism according to the invention.

The latching mechanism uses a latching roller 130 as a first latching element or cam and an armature as a retention or second latching element 140. The drive D comprises a drive lever 100, but it could instead be an electric motor and gear drive MG as shown in FIG. 1.

FIG. 2A shows a door 200 having mounted in its structure the movement mechanism or drive D, whereby the door 200 is shown to be neither latched nor locked. A single latching and locking shaft 170 is mounted for rotation in the door structure. Hence, the latching and locking shaft 170 can be rotated about a shaft axis 170'.

The drive lever 100 is rigidly attached to the drive shaft 110 and has been moved counterclockwise downwardly to bring the door 200 into the "closed position". As is shown, the drive shaft 110 carries three lever arms 111, 112 and 114 rigidly secured to the shaft 110 at defined angular positions relative to each other around an axis 110'. The shaft 110 is rotatably mounted in the door structure. A coupling rod 113 with spring means (not shown) is movably held or journaled in the arm 112. A lock drive 150 forming a second force transmission is journaled by a journal 111' in the arm 111 which forms a second coupling lever arm rigidly secured to the drive shaft 110. A latch drive 120 is journaled by a journal 114' in the arm 114 which forms a first coupling lever arm that is rigidly secured to the drive shaft 110. In FIG. 2A the latch drive 120 is located away or spaced from a second stop 121. The upper end of the lock drive 150 is journaled in a fork by a journal 150' to a second locking member 190. If the second locking member 190 is journaled to a lock axis 180 the latter is rigidly mounted in the door structure. This arrangement may be reversed.

The latch drive 120 forming a first force transmission is movably held or journaled at 114' in the first coupling lever arm 114 of the drive shaft 110. The upper end of the drive 120 is movably held or journaled at 120' in a third coupling lever arm 132. The third lever arm 132 is rigidly secured to the latching shaft 170. The latching shaft 170 carries a first lock member 160 rigidly secured to the latching shaft 170. A first latching element 130 is operatively secured to a lever arm 131 which is rigidly secured to the latching shaft 170, whereby the first latching element 130 can be moved against a first stop 135 secured in the door structure. Furthermore, a rod 134 with spring means not shown is movably journaled on an arm 133, for example for the purpose of operating an indicator not shown but provided to display the latched and locked states of the door in response to rotation of the single drive shaft 110. A retention means or second latch element 140 is attached to the frame of the aircraft structure or fuselage F seen in FIG. 1. The first latching element 130 will engage a second latch element 140 as will be described below.

FIG. 2B shows the present device in a "latched position" but not yet in a "locked and latched position". As is shown, the drive lever 100 has been tilted further downwardly thereby rotating the drive shaft 110 counterclockwise about the axis 110'. Consequently the latch drive 120 has been moved up, thus rotating the single latching and locking shaft 170 clockwise about its axis 170'. During this further rotation of the single latching and locking shaft 170, the arm 131 with the first latch element 130 was pushed to engage the retention or second latch element 140, whereby the roller forming the latch element 130, was guided to its limit position, i.e. into the "latched position". The latched position is reached and the arm 131 rests against a first stop 135 secured in a fixed position in the aircraft door.

Furthermore, FIG. 2B shows that the first locking member 160 is positioned in its limit position relative to the second locking member 190, since during the latching motion the locking member 190 with its cam was tilted toward the lock member 160. However, the first locking member 160 and the second locking member 190 are not yet fully engaged;

they are still spaced apart. Thus the "latched and locked" position has not yet been reached.

FIG. 2C shows the present device in the "latched position" and in the "latched and locked position". This state was reached in that the drive lever 100 was moved along a small remaining angular travel distance of about 4° to its limit position, whereby the coupling lever arm 114 of the drive shaft 110 rests against the second stop 121. In this way, in addition to the "latched position" as shown in FIG. 2B, a "latched and locked position" is reached. By respectively constructing the drive D, more specifically properly angularly spacing the drive coupling lever arms 111 and 114 relative to each other around the axis 110' further angular movement of the lock drive 150 is achieved in addition to the operation of the latch drive 120-. As mentioned the described drive mechanism of rods and journal links with angular positions and dead points is most efficient and cost effective for this purpose. As the latch drive 120 rests against the second stop 121, the arm 131 of the latch element 130 rests against the first stop 135.

FIG. 2C further shows that the cam or head of the second lock element 190 engages the first lock element 160, at a slight distance. This provides a safeguard against any unintentional reverse rotation of the latch axis 170 when a failure occurs or the latch drive 120 is deformed. Thus, in addition to the "latched position", the "latched and locked position" has been reached.

Opening of the door takes place in the reverse order. When the drive D, particularly the lever 100 is moved counterclockwise, first the "latched and locked position" and then the "latched and closed positions" are cancelled. The door is lifted and can now swing open.

According to another embodiment, the invention makes it possible, by way of the rotary movement of the latch axis 17, for example additionally to move a vent flap (not shown) in a passenger door, by means of a suitable transmission mechanism. For example the link 134 could be used for this purpose instead of driving an indicator. In this way, in a synchronized switching action towards the latched and locked position, the vent flap, too, is latched and locked. This is an additional advantage. A synchronized control of all components driven by the same drive D is achieved, for example for a movable display or indicator arranged in the door. Furthermore, it would also be possible to move the door from an open position to the closed position by the same drive D through the link and rod 113.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for latching and safety locking a door in a door frame, said apparatus comprising:

a drive shaft (110) rotatably mounted in said door, drive means (100, MG) operatively connected to said drive shaft for rotating said drive shaft (110) through a first angular range toward a dead point and through a second angular range beyond said dead point, a latching and locking shaft (170) rotatably mounted in said door, a latching force transmitting link (120) operatively interposed between said latching and locking shaft (170) and said drive shaft (110) for transmitting a latching drive force from said drive shaft (110) to said latching and locking shaft (170) when said drive shaft is rotated toward said dead point, a locking force transmitting link (150) operatively interposed between said drive shaft (110) and said latching and locking shaft (170) for transmitting a locking force from said drive shaft (110) to said latching and locking shaft (170) when said drive shaft is rotated through said second angular range beyond said dead point, a first pair of stop means (131, 135) cooperating with said latching and locking shaft (170) for stopping further rotation of said latching and locking shaft (170) when said drive shaft (110) reaches said dead point after passing through said first angular range, a second pair of stop means (114, 121) cooperating with said drive shaft (110) for stopping any further rotation of said drive shaft (110) outside said second angular range, so that said locking force transmitting link (150) is movable during rotation of said drive shaft through said second angular range into a position for applying said locking force to said latching and locking shaft (170).

2. The apparatus of claim 1, wherein said latching force transmitting link (120) comprises a first coupling rod (120) and journal members (114', 120') operatively connecting said first coupling rod to said drive shaft (110) and to said latching and locking shaft (170), and wherein said locking force transmitting link (150) comprises a second coupling rod (150), a locking member (190) and further journal members (111', 150', 180) for operatively connecting said second coupling rod (150) to said locking member (190) for applying said locking force to said latching and locking shaft (170) when said drive shaft (110) is rotated through said second angular range beyond said dead point.

3. The apparatus of claim 1, further comprising a first latching element (130, 131) operatively connected to said latching and locking shaft (170), a second latching element (140) rigidly secured to a fixed point in a position for cooperation with said first latching element (130, 131), wherein said first latching element comprises a latching cam or roller (130) for cooperation with said second latching element (140), and further comprising a locking member (160) rigidly connected to said latching and locking shaft (170), and wherein said locking force transmitting link (150) comprises a locking cam (190) for cooperation with said locking member (160).

4. The apparatus of claim 1, comprising a third coupling link (133, 134) operatively connected to said latching and locking shaft (170).

5. The apparatus of claim 1, wherein said second angular spacing beyond said dead point is sufficient for moving said locking force transmitting link (150) into a locked position that can be released only by a rotation of said drive shaft (110) in an unlocking direction.

6. The apparatus of claim 5, wherein said second angular spacing is 4°.

7. The apparatus of claim 1, comprising a fourth coupling link (112, 113) operatively connected to said drive shaft (110).

8. The apparatus of claim 1, wherein said first pair of stop means (131, 135) and said second pair of stop means (121, 114) are so positioned that said second stop means become effective after said first stop means when said drive shaft (110) is rotated counterclockwise for establishing a latched and locked condition of said door.

9. The apparatus of claim 1, further comprising a first coupling lever arm (114) rigidly connected to said drive shaft, a second coupling lever arm (111) rigidly connected to said drive shaft (110), an angular spacing between said first and second coupling lever arms around said drive shaft (110), and a third coupling lever arm (132) rigidly connected to said single latching and locking shaft (170).

* * * * *

UNITED STATES PATENT AND TRADEMARK OFFICE
CERTIFICATE OF CORRECTION

PATENT NO. : 6,457,674 B2
DATED : October 1, 2002
INVENTOR(S) : Hannes Erben et al.

It is certified that error appears in the above-identified patent and that said Letters Patent is hereby corrected as shown below:

Column 1,
Line 59, replace "f light" by -- flight --;

Column 4,
Line 41, after "distance", replace "to. travel" by -- to travel --; and after "approximately", replace "40°" by -- 4° --;
Line 46 after "about", replace "40°" by -- 4° --;
Line 66 after "about", replace "40" by -- 4° --;

Column 5,
Line 6, after "possible.", delete "is";

Column 7,
Line 11, after "engaged;", there is no new paragraph;
Line 27, after "drive", replace "120-." by -- 120. --.

Signed and Sealed this

Fourth Day of March, 2003

JAMES E. ROGAN
*Director of the United States Patent and Trademark Office*